United States Patent [19]

Knifton

[11] 3,919,272
[45] Nov. 11, 1975

[54] PROCESS FOR PREPARING LINEAR FATTY ACIDS

[75] Inventor: John F. Knifton, Poughquag, N.Y.

[73] Assignee: Texaco Inc., New York, N.Y.

[22] Filed: Feb. 2, 1972

[21] Appl. No.: 223,014

[52] U.S. Cl............ 260/410.9 R; 260/410; 260/413; 260/410.5; 260/479 R; 260/497 A; 260/533 A
[51] Int. Cl.² ................. C07C 51/14; C07C 67/38
[58] Field of Search ...... 260/410.9 R, 413, 533 AN, 260/497 B

[56] References Cited
UNITED STATES PATENTS

| | | | |
|---|---|---|---|
| 2,876,254 | 3/1959 | Jenner et al. | 260/486 |
| 3,437,676 | 4/1969 | vonKutepow et al. | 260/468 |
| 3,455,989 | 7/1969 | vonKutepow et al. | 260/468 |
| 3,641,074 | 2/1972 | Fenton | 260/410.9 |
| 3,657,368 | 4/1972 | Parshall | 260/666 A |
| 3,700,706 | 10/1972 | Butter | 260/410.9 R |
| 3,776,929 | 12/1973 | Mrowca | 260/429 R |

OTHER PUBLICATIONS

Yamaguchi et al., Chemical Abstracts, 77 139448k (1972).

*Primary Examiner*—Raymond V. Rush
*Assistant Examiner*—Diana G. Rivers
*Attorney, Agent, or Firm*—T. H. Whaley; C. G. Ries; Bernard Marlowe

[57] ABSTRACT

This invention concerns a process for preparing linear fatty acids and esters from alpha-olefins and carbon monoxide in the presence of homogenous palladium complexes.

4 Claims, No Drawings

PROCESS FOR PREPARING LINEAR FATTY ACIDS

This invention relates to the catalytic conversion of alpha olefins to linear fatty acids or esters.

More particularly, this invention concerns the carboxylation of alpha olefins with carbon monoxide under elevated reaction conditions of temperature and pressure, using ligand stabilized palladium(II) - Group IVB halide catalysts.

Carboxylation as used throughout this disclosure and claims refers to the process of preparing linear saturated linear carboxylic acids or esters from alpha olefin substrates. Linear carboxylic esters are of the type: RCOOR' wherein R is a saturated alkyl radical containing 3 to 40 carbon atoms, wherein R' is an aliphatic or aromatic radical.

BACKGROUND OF THE INVENTION

Carboxylic acids are characterized by the presence of one or more carboxyl groups in an organic molecule. The acids are usually written as COOH. The hydrogen atom of this group may be displaced and appear as a hydronium ion thereby justifying by theory the term acid.

The saturated (fatty) carboxylic acids of the linear type are typical in their reactions as acids in general in that they form solid metal salts of the type RCOOM in which the M is a metal, they readily form esters in their reaction with most alcohols, glycols or polyols in the presence of acidic catalysts, they can be dehydrated to form anhydrides and they react with chlorine or bromine to form halogen substituted acids.

The saturated linear carboxylic acids are prepared by a large number of general procedures such as the oxidation of primary alcohols or aldehydes, the catalytic hydrolysis of nitriles, the reaction of Grignard reagents with carbon dioxide as well as by several special procedures for specific acids including fermentation, the acetoacetic ester synthesis, the malonic ester synthesis and the Reformatsky reaction.

In recent years, with the availability of large quantities of alpha-olefins from wax cracking at relatively low costs, alpha-olefins have been suggested as starting materials for fatty acid production.

The carboxylation of olefins in the presence of metal carbonyls or carbonyl precursors to produce carboxylic acids or esters is old in the literature, originally having been developed by Reppe* and his coworkers. However, the nickel and iron salts or carbonyl precursors suffer from some major drawbacks. These drawbacks include the high toxicity of the carbonyl type reagents, the production of a variety of undesirable side products due to polymerization, isomerization and reduction of the olefin substrates and most importantly, the reaction results in the production of large quantities of branched isomers in addition to the desired linear fatty acid product.
*This work is reviewed by C. W. Bird, Rev. 62, 283 (1962)

It is now known that the production of the polymeric, isomeric and reduced products can be avoided through the use of alternative catalyst systems which are active under mild reaction conditions. However, even so, none of the described catalytic systems disclosed offers the desired combination of excellent yields of acid products and a high conversion of the substrate olefins to linear acid products. For example, the water-soluble platinum catalysts of the Jenner et al. patent are applicable only to olefins up to $C_6$ and the claimed process results in the preparation of primarily internal acid isomers. In view of these shortcomings, until this time, none of the prior art systems offer the desired combination of good yields, good conversions and good selectivity to the linear product.
**U.S. 2,876,254 (Jenner et al)

Desirably, a commercially attractive process would readily activate the alpha ($\alpha$) olefins at relatively mild conditions, without catalyzing their isomerization to internal isomeric products or reduction to the paraffins.

Ideally, the carboxylation process would form labile carbonyls by direct formation of a CO complex without the need for employing the toxic iron group carbonyls, and would be sufficiently sterically restrictive to assure that Co addition would preferentially take place at the terminal carbon of the olefin substrate.

Recently Bitler et al.* have reported the synthesis of $C_3$–$C_4$ fatty acids in about 90 percent yields but with only 30 percent linearity using complex palladium(II) compounds having the general formula $L_mPdX_2$, where L denotes a ligand such as phosphine or amine and x is an acid residue and m+n is 3 or 4. Palladium chloride in combination with stannous chloride is also reportedly a carboxylation catalyst, however, this complex shows poor activity**, requires reaction temperature above 250°C, and is reduced to palladium metal by the CO*.
*K. Bittler et al., Angen. Chem. Internat. Edit. 1, 329(1968)
**L. J. Kehoe et al., J. Org. Chem. 35,2846(1970) L Inasmuch as applicants have found that ligandstabilized palladium (II) complexes in combination with a Group IVB metal halide salt are eminently suited for the carboxylation of alpha-olefins having at least a carbon range of $C_3$–$C_{40}$ to produce linear fatty acids with selectivities greater than 90%, applicants' success in the carboxylation reaction was completely unexpected and represents a teaching away from the closest art.

In practice, linear fatty acids containing at least 4 carbon atoms are produced from alpha ($\alpha$) olefins by a process comprising the following steps:

a. admixing each mole of alpha-olefin to be carboxylated with at least a molar equivalent of water, a catalytic quantity of a homogeneous, ligand-stabilized palladium(II) catalyst complexed with excess Group IVB metal halide in an oxygen free environment, in the presence of a pressurized carbon monoxide atmosphere, to form a reaction mixture, and b. heating said reaction mixture at 25°C and above until substantial carboxylation of the alpha olefin to the desired linear fatty acid is formed and isolating the fatty acids contained therein.

Linear fatty acid esters may be produced from $\alpha$-olefins by a similar process in which the alpha olefin to be carboxylated is admixed with a catalytic quantity of the homogeneous ligand-stabilized palladium(II)-Group IVB metal halide catalyst complex, and at least a molar equivalent of a suitable alkanol.

In order to present the inventive concept in the greatest possible detail, the following supplementary disclosure will be submitted:

A. Process Sequence and Variations. In general, the components of the carboxylation reaction mixture including optional inert solvent, water or alkanol, alpha olefin and catalyst may be added in any sequence as long as good agitation is employed to provide a homogeneous mixture. For example, the following represent some variations insofar as the catalyst, sequence of CO and heating that may be made without departing from the inventive process. These modifications include:

1. The catalyst may be preformed and added preformed to the reaction mixture.

2. Preferably to minimize stability problems with the catalyst, the catalyst is best formed in situ usually with the Group IVB metal halide being in excess followed by the addition of the ligand stabilized palladium(II) salt.

3. After using either variation 1 or 2 the catalyst containing reaction mixture is pressurized with CO and heated. If water is present in the reaction mixture, then the principal product will be a linear fatty acid having one more carbon atom than the α-olefin charged. If an alkanol is present, the corresponding ester of the carboxylic acid will be formed. The formation of the ester is useful both in product applications, and for rapid chromatographic analysis.

4. After using either variation 1 or 2 the catalyst solution α-olefin and either water or an alkanol can be heated first under an inert atmosphere or a small pressure of CO (10-100 psig) then pressurized to the desired extent with carbon monoxide to form the desired linear carboxylic acid or ester.

5. A substantial process variation that can be employed when the catalyst is formed in situ in an inert solvent is to heat the catalyst containing solution to temperature under an inert atmosphere or a small pressure of CO, and then to add the alkanol or water, the olefin and carbon monoxide with efficient agitation, and to maintain the CO pressure in the reactor until the ester or free acid is formed.

B. Ligand Stabilized Palladium(II) Catalyst Complex — The use of ligand stabilized Palladium(II) catalyst systems complexed with a Group IVB metal halide is essential to the inventive carboxylation process. The key elements of the ligands used to stabilize the palladium(II) catalysts are selected from those elements of Group VB or VIB of the Periodic Chart of the Elements (Advanced Inorganic Chemistry by F. A. Cotton and G. Wilkinson, 2nd Ed., 1966) selected from nitrogen arsenic, antimony, sulphur, selenium, bismuth and phosphorous. Ilustrative of ligands used to stabilize the palladium(II) catalysts are: $As(C_6H_5)_3$, $Sb(C_6H_5)_3$, $Bi(C_6H_5)_3$, $P(C_6H_5)_3$, $P(CH_3)_2(C_6H_5)$, $As(n-C_4H_9)_3$, $P(p-CH_3(C_6H_4)_3$, $P(C_6H_{11})_3$, $(C_6H_5)_2P(CH_2)_2P(C_6H_5)_2$, $P(OC_6H_5)_3$, $S(C_6H_5)_2$, $P[(p-CH_3C_6H_4)(C_6H_5)_2]$, pyridine, ethylenediamine and 1,10-phenanthroline.

Illustrative of the Group IVB metal halides that can be complexed with the ligand-stabilized palladium(II) to form an active carboxylation catalyst are tin(II) chloride, tin(IV) chloride, tin(II)bromide, germanium (II) chloride and germanium(II) bromide.

C. Ligand Stabilized Palladium(II)-Group IVB Halide Catalyst Complex — The following complexes are among the many ligand-stabilized palladium(II)-Group IVB metal halide complexes which can be used in the inventive carboxylation as the catalyst system: $PdCl_2(P(C_6H_5)_3)_2$—$SnCl_2$, $PdCl_2(As(C_6H_5)_3)_2$—$SnCl_2$, $PdBr_2[p(C_6H_5)_3]_2$, —$SnBr_2$, $PdBr_2[Sb(C_6H_5)_3]_2$—$GeBr_2$, $PdCl_2(P(C_6H_5)_3)_2$—$GeCl_2$, $PdCl_2[P(C_2H_5)_2—(C_6H_5)]_2$—$SnCl_2$, $PdCl_2(P(p-CH_3C_6H_4)(C_6H_5)_2)_2$—$SnCl_2$, $PdCl_2(P(p-CH_3C_6H_4)_3)_2$—$SnCl_2$, $PdCl_2[C_6H_5)_2PCH_2CH_2P(-C_6H_5)_2]$—$SnCl_2$,$PdCl_2[As(CH_3)_2C_6H_5]_2$—$SnCl_2$, $pdCl_2[P(C_6H_{11})_3]_2$—$SnCl_2$. One convenient mode of preparation of the ligand-stabilized palladium(II)-Group IVB metal halide catalyst complexes is in situ wherein palladium(II) halide complex such as $PdCl_2[P(C_6H_5)_3]_2$ is mixed with a large molar excess of Group IVB metal halide, preferentially $SnCl_2$ or $GeCl_2$. While no structural configuration is advocated, nor is the success of the catalyst postulated upon a given structure, it is assumed that a typical ligand-stabilized palladium(II) stannous chloride complex such as the "triphenyl phosphine" can be represented as:

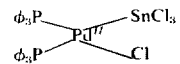

D. Ratio of Stannous Halide to Ligand-Stabilized Palladium(II) Catalyst — While the molar ratio of stannous chloride to the ligand stabilized palladium(II) halide is not critical, the experimental work performed indicates that at least 1 mole of stannous chloride for each mole of palladium(II) chloride is required for reproducibility and good selectivity. Preferably a ratio of from 5 to 10 moles of stannous chloride for each mole of palladium(II) complex has been established to give the optimum amount of linear fatty ester based upon the carboxylation of 1-heptene. Table IV documents this work.

E. Ratio of Ligand Stabilized Palladium(II) Halide Catalyst Complex to Alpha Olefin Substrate — Experimental work indicates that a molar ratio of up to 500 moles to 1000 moles of alpha olefin per mole of palladium(II) catalyst complex can be employed in most instances where alpha olefins typified by 1-heptene are used as the substrate. Much lower ratios (i.e. 25 moles of olefin substrate per mole of platinum halide) are not harmful but are economically unattractive. For this reason the preferred molar range arrived at in Table IV ranges from 50 to 200 moles of olefin per mole of palladium(II) complex catalyst.

F. Temperature Required for Carboxylation — The temperature range which can be employed for carboxylation is variable dependent upon other experimental factors including the alpha-olefin employed, the pressure, the concentration and the particular choice of palladium catalyst among other things. Again using 1-heptene as a typical alpha olefin and $PdCl_2[P(C_6H_5)_3]PdCl_2$—$SnCl_2$ as a representative catalyst, the range of operability is from 25° to 120°C when superatmospheric pressures of 2000 psig are employed. A narrower range of 60°C to 80°C represents the preferred temperature range when the aformentioned olefin is carboxylated at 2000 psig using the catalyst system described supra. Table VII is evidenciary of how this narrower range is derived.

G. Pressure — Superatmospheric pressures of carbon monoxide at least 100 psig are required for substantial conversion of the alpha olefin to the carboxylic acid (or ester) at temperatures of 25° to 120°C using $PdCl_2[P(C_6H_5)_3]_2$—$SnCl_2$ as catalyst and 1-heptene as the alpha olefin. At least a stoichiometric quantity of pressurized carbon monoxide is used, said stoichiometry being based upon the alpha olefin content in said mixture. Table VI provides the supporting experimental data which establishes that pressures above 3000 psig are harmful due to catalyst decomposition, while at pressures of less than 100 psig carboxylation is impractically slow.

H. Reaction Times Required — As previously indicated in the analogous discussion on temperatures and pressures required in the reaction, experimental variables are important in arriving at reaction times. Generally substantial conversions (70 percent or higher) of the olefin to the carboxylic acids can almost always be accomplished within 6 hours with 2 to 4 hours representing the more usual reaction time interval.

I. Alpha ($\alpha$) Olefins as Substrates — Alpha olefins ranging in carbon content from three (3) up to 40 carbon atoms can be employed. Illustrative linear alpha olefin substrates include 1-propene, 1-butene, 1-pentene, 1-hexene, 1-heptene, 1-octene, 1-nonene, 1-decene, 1-undecene, 1-dodecene, 1-tetradecene as well as their higher homologues such as 1-heptadecene, 1-octadecene, 1-eicosene, tricosene, 1-pentacosene, etc. Branched alpha-olefins can also be carboxylated. Illustrative branched alpha olefin substrates are 3-methyl-1-pentene, 4-methyl-1-pentene, 4,4-diethyl-1-pentene and 3,6,9-trimethyl-1-decene. These olefin substrates may be utilized neat or in conjuction with one or more inert background solvents such as the saturated paraffins including pentanes, hexanes, heptanes, octanes and the like. The alpha olefins can be in the form of single, discrete compounds or in the form of mixtures of olefins. In the latter case these comprise mixtures of $C_3$ to $C_{30}$ carbon containing alpha olefins. Usually these mixtures have a spread of from 4 to 8 carbon atoms. Because of their relatively low cost, mixtures of alpha olefins ranging in carbon content from $C_5$ to $C_{15}$ and upwards are favored substrates for carboxylation wherein the ligand-stabilized palladium(II) homogeneous catalysts are employed at sufficiently elevated temperatures and pressures.

J. Alcohol Co-Reactant — If it is desired to prepare linear fatty acid esters, an alcohol coreactant must be present in the reaction mixture with the $\alpha$-olefin substrate and carbon monoxide. The alcohol may be a monohydric primary or secondary alkanol of up to twelve carbon atoms, a substituted alcohol, a phenol, or a substituted phenol. Suitable examples include methanol, ethanol, isopropanol, dodecanol, phenol, 2-chloroethanol, methylcyclohexanol and the like.

Alternatively, the alcohol may be polyol containing two or more hydroxyl groupings. Illustrative examples of suitable polyols include propylene glycol, neopentyl glycol, trimethylol propane and pentaerythritol. As indicated earlier the use of water produces the free acid.

K. Carbon Monoxide Environment — Insofar as can be determined the best selectivities and conversions of alpha olefins to linear fatty acids can be obtained within a reasonable reaction time by using a substantially carbon monoxide gaseous atmosphere. However, particularly in continuous operation the carbon monoxide may be used in conjunction with from about 0 to 30 percent by volume of one or more inert gases such as nitrogen, argon, neon and the like without experiencing a substantial decrease in yield and selectivity.

L. Inert Solvents — The novel carboxylation is run most conveniently in the presence of an inert diluent. A variety of solvents can be used, including aromatics such as benzene, toluene and xylenes, halogenated aromatics including o-dichlorobenzene, ketones like acetone and methyl isobutyl ketone, ethers such as dimethoxyethane and p-dioxane, and halogenated paraffins including methylene chloride.

M. Selectivity as defined herein is the efficiency in catalyzing a desired carboxylation reaction relative to other undesired carboxylation reactions; in this instance carboxylation to the linear fatty acid or ester derivative is the desired conversion. Selectivity is usually expressed as a percentile and is calculated herein by determining the amount of linear carboxylated product formed, divided by the total amount of carboxylated products formed and multiplying the quotient obtained by 100.

N. Conversion as defined herein, is the efficiency in converting the alpha olefin to non-alpha olefin products. Conversion also is expressed as a percentile and is calculated herein by dividing the amount of alpha olefin consumed during carboxylation by the amount of alpha olefin originally charged and multiplying the quotient by 100.

O. Yield as defined herein, is the efficiency in catalyzing a desired carboxylation reaction relating to other undesired reactions. In this instance, carboxylation to the linear fatty acid or ester derivative is the desired conversion. Yield is usually expressed as a percentile, and is calculated herein by determining the amount of linear carboxylated product formed, divided by the amount of alpha olefin charged, and multiplying the quotient by 100.

P. By-Products — As far as can be determined, without limiting the invention thereby, carboxylation of $\alpha$-olefins catalyzed by the ligand-stabilized palladium(II)-Group IVB metal halide complexes leads to the formation of only two minor by-products. These are a) internal olefins due to $\alpha$-olefin isomerization and b) branched (2-methyl) acids or esters due to CO addition at the second carbon atom of the $\alpha$-olefin charge. For runs made under various experimental conditions, the extent of by-product formation (normally less than 10% of the total product) is listed in the following tables under percent isomerization and percent linear ester (calculated from: total linear acid ester/total linear + branched ester).

These by-products may be separated from the desired linear fatty acids or esters by the usual chemical or physical techniques.

Q. Indentification procedures where applicable are by one or more of the following analytical procedures — gas chromatography (g.c.), infrared, nuclear magnetic resonance and elemental analysis. Unless otherwise specified all percentages are by weight rather than volume and all temperatures are in centigrade rather than fahrenheit.

Having described the inventive process in general terms, the following examples are submitted to supply specific and illustrative embodiments.

EXAMPLE 1

Preparation of Methyl Caprylate Using a Ligand Stabilized Palladium(II) Stannous Chloride Catalyst.

1A. To a reactor providing agitating, heating, cooling and pressurizing means is added a charge of 100 g. of methyl isobutyl ketone, 10 g. of methanol (313 mmoles) and 10 g. of 1-heptene (102 mmoles). The liquid mixture is degassed, and then 2.24 g. (10 mmole) of stannous chloride dihydrate is added with stirring, followed by 0.70 g. (1 mmole) of bis(triphenylphosphine)-palladium(II) chloride. After the dissolution of all solids, the reactor is sealed and pressurized to 2000 psig with carbon monoxide and heated to 70°C for 4 hours. At the end of this time, the reaction is terminated by cooling the reactor, venting off the gases and distilling the red solution to recover an ester product, identified as methyl caprylate, [CH$_3$(CH$_2$)$_6$COOCH$_3$], in 93% yield (15.0 g). Identification was by gas chromatography (g.c.), infrared, nuclear magnetic resonance (NMR) and comparison with an authenticated sample of methyl caprylate.

1B. The same preparation is made except that the catalyst (formed in situ as in "1A") and the degassed solvents methyl isobutyl ketone (100 g) and methanol (10 g) are heated to 70°C with stirring under a small pressure of CO(10–100 psig) and the 1-heptene (10 g) is added to the catalyst-solvent mixture with agitation, then the reactor is sealed and pressurized to 2000 psig with CO. Again after isolation, the distilled product is determined to be the methyl caprylate product of 1A.

EXAMPLE 2

Preparation of Caprylic Acid (Octanoic Acid) using a Ligand Stabilized Palladium(II)Stannous Chloride Catalyst.

The same procedure followed in 1A is used in this run except only 5 g (280 mmole) of water is used instead of methanol. The other quantities of reactants, catalyst components and solvents are employed and the reaction mixture sealed and pressurized to 2000 psig and heated to 70°C for 4 hours. After terminating the reaction, cooling and separation, the product is confirmed to be caprylic acid [CH$_3$(CH$_2$)$_6$COOH] contaminated with a small amount of the 2-methyl heptanoic acid.

EXAMPLE 3

Preparation of a mixture of Methyl Caprylate and Methyl 2-Methyl Heptanoate using the Ligand Stabilized Palladium Complex of Example 1 but without Stannous Chloride In this preparation the procedure of Example 1A is followed exactly including the same molar ratio of 1-heptene to catalyst except that the stannous chloride component of the ligand-stabilized palladium(II) catalyst is omitted. Again the reaction mixture is heated to 70°C under 2000 psig of CO for 4 hours. At the end of this time the liquid product found in the reactor after cooling and venting is analyzed by g.c., IR and NMR. 1-Heptene conversion is almost complete, but the product ester fraction consists of a near equimolar mixture of methyl 2-methyl heptanoate, [CH$_3$(CH$_2$)$_4$CH(CH$_3$)COOCH$_3$] (5.0 g, 31% yield) and methyl caprylate (6.77 g, 42% yield).

This run demonstrates that to achieve high selectivity to the linear fatty acid or ester, stannous chloride or another Group IVB metal halide is an essential component of the ligand-stabilized palladium(II) catalyst of this invention.

EXAMPLES 4 TO 8

The Carboxylation of Various Alpha Olefins ranging from 3 carbons and up using the PdCl$_2$(P(C$_6$H$_5$)$_3$)$_2$-SnCl$_2$ complex as catalyst In these examples, carboxylations are carried out on the indicated alpha olefins under the listed reaction conditions using the in situ procedure of Example 1B. Olefin conversion and selectivities to the ester products are disclosed in Table I.

It will be seen that linear α-olefins having at least 3 to 20 carbon atoms may be carboxylated to the corresponding linear fatty acid ester using the PdCl$_2$(P(C$_6$H$_5$)$_3$)$_2$-SnCl$_2$ catalyst.

Under similar experimental conditions, branched α-olefins like 3-methyl-1-pentene may also be carboxylated.

TABLE I

CARBOXYLATION OF VARIOUS OLEFINS USING THE PdCl$_2$(P(C$_6$H$_5$)$_3$)$_2$-SnCl$_2$ CATALYST*

| EXAMPLE | ALKENE | ALKENE/Pd MOLAR RATIO | REACTION TIME(MIN.) | ALKENE CARBOXYLATION (% CONVERSION) | CARBOXYLATED PRODUCTS ESTER | SELECTIVITY |
|---|---|---|---|---|---|---|
| 4 | PROPYLENE | 100 | 180 | 90 | METHYL BURYRATE | 85 |
| 5 | 1-HEPTENE | 100 | 210 | 100 | METHYL OCTANOATE | 91 |
| 6 | 1-TETRADECENE | 100 | 300 | 100 | METHYL PENTADECANOATE | 90 |
| 7 | 1-EICOSENE | 100 | 360 | 20 | METHYL HENEICOSATE | 91 |
| 8 | 3-METHYL-1-PENTENE | 100 | 360 | 100 | METHYL 4-METHYL HEXANOATE | 95 |

*Reaction Conditions — Temperature, 70°C; Pressure, 2000 psig; Solvent, Methyl isobutyl ketone; Alcohol co-reactant, excess methanol

EXAMPLES 9 TO 15

The Carboxylation of 1-Heptene using different Ligand Stabilized Palladium(II) Group IVB Metal Halide Catalyst Complexes In these examples the carboxylations were carried out on 1-heptene using various ligand stabilized palladium(II)Group IVB metal halide homogeneous catalysts under constant temperature, pressure, substrate-to-catalyst molar ratios. Methyl isobutyl ketone was used as solvent in all runs. As can be seen from the data in Table II, which follows, a variety of stabilizing ligands can be used with the palladium(II)-Group IVB metal halide catalysts, including ligands containing nitrogen, phosphorus arsenic, and sulphur donor atoms. These ligands may be monodentate or multidentate, and may contain the alkyl, aryl, aryloxide, and substituted aryl groupings.

The Group IVB metal halide may be selected from the group including stannous chloride, germanium(II) chloride and stannous bromide.

Good 1-heptene conversions and methyl octanoate yields were obtained with the bis(triphenylphosphine) palladium(II) chloride - tin(II) chloride, bis(triphenylphosphine) palladium(II) chloride - germanium(II) chloride and bis(tri-p-tolylphosphine) palladium(II) chloride-tin(II) chloride catalysts (Examples 9, 10 and 13).

As can be seen by Table II, Col. 5, for each palladium catalyst the two principal side reactions are:

a. Isomerization of the 1-heptene to internal isomers, mainly cis and trans 2-heptenes.

b. The formation of some branched (α-methyl) fatty acid ester (see Table II, Col. 6). In these runs, the by-product was methyl 2-methyl heptanoate.

The date in Table II for the ligand-stabilized palladium(II)-Group IVB metal halide catalysts are in contrast to those for the analogous ligand-stabilized platinum(II)-Group IVB metal halide carboxylation catalysts (Ser. No. 223,014 filed Feb. 2, 1972). In the case of the palladium complexes, for example, the germanium(II) complexes $PdCl_2(P(C_6H_5)_3)_2$—$GeCl_2$ and $PdCl_{2(As(C_6H_5)_3)_2}$—$GeCl_2$ are both active carboxylation conditions, while under similar conditions, the analogous platinum(II) complexes are inactive. On the other hand, the palladium(II)-arsine-stannous chloride complex, $PdCl_2[As(C_6H_5)_3]_2SnCl_2$ and the iodide homologue $PdI_2[As(C_6H_5)_3]_2$—$SnI_2$ show no activity, while the same platinum(II) complexes are excellent catalysts, in fact the $PtCl_2[As(C_6H_5)_3]_2$ —$_{SnCl_2}$ is the preferred platinum catalysis basis olefin conversion and fatty acid ester yields. Comparative data for the platinum and palladium catalysts are summarized in Table III.

TABLE III-continued

A COMPARISON OF PLATINUM AND PALLADIUM CARBOXYLATION CATALYSTS

| CATALYST | M=Pd | M=Pt |
|---|---|---|
| CO Pressure: | 3000 psig | |
| Time: | 360 Min. | |

EXAMPLES 16 TO 19

Synthesis of Methyl Octanoate from 1-Heptene The Effect of Varying the Stannous Chloride to Bis(triphenylphosphine)-palladium (II) Chloride Molar Ratio In this group of examples, 1-heptene is again selected as a typical alpha olefin and $PdCl_2[P(C_6H_5)_3]_2$—$SnCl_2$ is the catalyst employed. Keeping the experimental conditions unchanged, a favored range of stannous chloride can be determined by examining Table IV, which follows.

As can be seen from the data presented, the molar ratio of stannous chloride to bis(triphenylphosphine) palladium(II) chloride may be varied at least from 1 to

TABLE II

CARBOXYLATION OF 1-HEPTENE USING VARIOUS LIGAND STABILIZED PALLADIUM(II) - GROUP IVB METAL HALIDE COMPLEXES

| EXAMPLE | CATALYST | 1-HEPTENE CONVERSION (%) | METHYL OCTANOATE YIELD (%) | HEPTANE ISOMERIZATION (%) | PERCENT LINEAR ESTER |
|---|---|---|---|---|---|
| 9 | $PdCl_2(P(C_6H_5)_3)_2$-$SnCl_2$ | 100 | 72 | 4.1 | 90 |
| 10 | $PdCl_2(P(C_6H_5)_3)_2$-$GeCl_2$ | 100 | 73 | 3.7 | 90 |
| 11 | $PdCl_2(As(C_6H_5)_3)_2$-$GeCl_2$ | 42 | 23 | 2 | 76 |
| 12 | $PdCl_2(P(p$-$CH_3C_6H_4)_3)_2$-$SnCl_2$ | 100 | 78 | 4.7 | 90 |
| 13 | $PdCl_2[P(p$-$CH_3$-$C_6H_4)(C_6H_5)_2]_2$-$SnCl_2$ | 100 | 70 | 4.7 | 90 |
| 14 | $PdCl_2(P(OC_6H_5)_3)_2$-$SnCl_2$ | 3.0 | 2.8 | <1 | 90 |
| 15 | $PdCl_2(P(C_6H_{11})_3)_2$-$SnCl_2$ | 4.5 | 2.2 | 1 | 90 |
| 16 | $PdCl_2(P(CH_3)_2(C_6H_5))_3$-$SnCl_2$ | 65 | 52 | 5.8 | 89 |

Reaction Conditions — Temperature, 80°C; Pressure, 3000 psig; Solvent, 1-Heptene/Pd-100, Methanol/Heptene-7.6, Sn/Pd-10;Reaction time - 360 min.

TABLE IV

CARBOXYLATION OF 1-HEPTENE USING BIS(TRIPHENYL PHOSPHINE) PALLADIUM(II) CHLORIDE -TIN(II) CHLORIDE MOLAR RATIO CHANGES - I

| EXAMPLE | MOLAR RATIO OF: $PdCl_2(P\phi_3)_2$ | $S_nCl_2$ | 1-HEPTENE | 1-HEPTENE CONVERSION (%) | METHYL OCTANOATE YIELD(%) | HEPTENE ISOMERIZATION (%) | PER CENT LINEAR ESTER |
|---|---|---|---|---|---|---|---|
| 16 | 1 | 1 | 100 | 43 | 35 | 1 | 86 |
| 17 | 1 | 5 | 100 | 100 | >90 | 3.3 | 89 |
| 18 | 1 | 10 | 100 | 100 | 92 | 7.1 | 91 |
| 19 | 1 | 30 | 100 | 85 | 82 | 9.5 | 89 |
| 20 | 1 | 10 | 1000 | 40 | 36 | 2 | 93 |
| 21 | 1 | 10 | 200 | 100 | 93 | 7.1 | 93 |
| 22 | 1 | 10 | 25 | 100 | 92 | 7.7 | 85 |

Run Conditions:2000 psig of Co. Reaction Time:360 min. Reaction Temp.70–80°C

TABLE III

A COMPARISON OF PLATINUM AND PALLADIUM CARBOXYLATION CATALYSTS

| CATALYST | M=Pd | M=Pt |
|---|---|---|
| $MCl_2(P(C_6H_5)_3)_2$-$SnCl_2$ | Active | Active |
| $MCl_2(As(C_6H_5)_3)_2$-$SnCl_2$ | Inactive | Active |
| $MCl_2(Sb(C_6H_5)_3)_2$-$SnCl_2$ | Inactive | Active |
| $MI_2(P(C_6H_5)_3)_2$-$SnI_2$ | Inactive | Active |
| $MI_2(As(C_6H_5)_3)_2$-$SnI_2$ | Inactive | Active |
| $MCl_2(P(C_6H_5)_3)_2$-$GeCl_2$ | Active | Weakly active |
| $MCl_2(As(C_6H_5)_3)_2$-$GeCl_2$ | Active | Inactive |

| Run Conditions: | 1-Heptene/M (Molar Ratio) = 100 |
|---|---|
| | Sn/M (Molar Ratio) = 10 |
| Solvent: | Methyl Isobutyl Ketone |
| Temperature: | 80°C |

30. The preferred range of Sn:Pd molar ratio is from 5 to 10.

EXAMPLES 20 TO 22

SYNTHESIS OF METHYL OCTANOATE FROM 1-HEPTENE. THE EFFECT OF VARYING THE α-OLEFIN TO PALLADIUM MOLAR RATIO

In this group of examples, $Pdcl_2[P(C_6H_5)_3]_2$—$SnCl_2$ is again the catalyst, and the experimental procedure is similar to that described in Example 1B. Keeping the other conditions unchanged, a favored range of olefin to palladium catalyst can be determined by examining Table IV.

As can be seen from the data presented, the molar ratios of α-olefin to palladium catalyst may be raised at least from 25 to 1000, but as the highest yields of linear ester are obtained at molar ratios of 50 to 200, this represents the preferred range.

EXAMPLES 23 TO 26

SYNTHESIS OF METHYL OCTANOATE FROM 1-HEPTENE. THE EFFECT OF CHANGING THE α-OLEFIN TO ALCOHOL MOLAR RATIO

In this series of experiments, as in Example 1B, 1-heptene and methanol are reactants, and $PdCl_2[P(C_6H_5)_3]_2SnCl_2$ is the catalyst complex. Keeping other experimental conditions unchanged, the methanol-to-1-heptene molar ratio is raised from 0.5 to 25.

It is apparent from the data presented in Table V, which follows, that at least a molar equivalent of methanol-α-olefin is necessary to ensure good yields of the linear fatty acid ester.

The same was found to hold true when water is substituted for methanol in the reaction mixture to make the linear fatty acid:

In this procedure, using the techniques disclosed in Example 1, and keeping the reaction temperature constant, the effect of varying the carbon monoxide pressure on the methyl octanoate yield and 1-heptene conversion is determined. As the data in Table VI indicate, the rate of carboxylation is slow at CO pressures of less than 500 psig, while there is no apparent advantage to operating at CO pressures of 4000 psig or more. The preferred range of CO pressures is, therefore, 1000 to 3000 psig.

EXAMPLES 33 TO 37

SYNTHESIS OF METHYL OCTANOATE FROM 1-HEPTENE. THE EFFECT OF VARYING REACTION TEMPERATURE

In this procedure, the techniques of Example 1B are employed, $[PdCl_2(C_6H_5)_3)_2—SnCl_2]$ is the catalyst complex, and reaction pressures are kept at 2000 psig to determine the effect of varying the reaction temperature on the 1-heptene conversion and methyl octanoate selectivity. As can be seen from Table VII, reactions run below 60°C are slow, while temperatures above 90°C cause catalyst decomposition. The most fa-

TABLE V

CARBOXYLATION OF 1-HEPTENE USING BIS(TRIPHENYL PHOSPHINE) PALLADIUM(II) CHLORIDE - TIN(II) CHLORIDE MOLAR RATIO CHANGES -II

| EXAMPLE | $PdCl_2(P\phi_3)_2$ | $S_nCl_2$ | 1-HEPTENE | METHANOL | 1-HEPTENE CONVERSION(%) | METHYL OCTANOATE YIELD(%) | PER CENT LINEAR ESTER |
|---|---|---|---|---|---|---|---|
| 23 | 1 | 10 | 100 | 2,500 | 100 | 91 | 91 |
| 24 | 1 | 10 | 100 | 750 | 100 | 92 | 91 |
| 25 | 1 | 10 | 100 | 100 | 100 | 71 | 89 |
| 26 | 1 | 10 | 100 | 50 | >90 | 41 | 88 |

Run Conditions: 70°C; 2000 psig; Reaction Time: 360 min.

EXAMPLES 27 TO 32

SYNTHESIS OF METHYL OCTANOATE FROM 1- vorable balance of conversion, selectivity and reation time are obtained with carboxylations run at temperatures between 60° and 80°C.

TABLE VI

CARBOXYLATION OF 1-HEPTENE USING BIS(TRIPHENYLPHOSPHINE) PALLADIUM(II) CHLORIDE — TIN(II) CHLORIDE CHANGES IN CO PRESSURE

| EXAMPLE | CARBON MONOXIDE PRESSURE (PSIG) | 1-HEPTENE CONVERSION(%) | METHYL OCTANOATE YIELD(%) | HEPTENE ISOMERIZATION(%) | PERCENTAGE LINEAR ESTER |
|---|---|---|---|---|---|
| 27* | 100 | 68 | 13 | 37 | 76 |
| 28 | 500 | 72 | 45 | 16 | 89 |
| 29 | 1000 | 99 | 81 | 9.6 | 91 |
| 30 | 2000 | 100 | 92 | 10 | 91 |
| 31 | 3000 | 100 | 76 | 3.6 | 90 |
| 32 | 4000 | 97 | 70 | 1.8 | 90 |

Run Conditions: 1-Heptene/Pd = 100; Methanol/Heptene = 7.6; Sn/Pd = 10; Reaction Temp: 70°C; Reaction Time: 360 min. *Reaction Time: 24 hours

HEPTENE. THE EFFECT OF VARYING THE CARBON MONOXIDE PRESSURE

TABLE VII

CARBOXYLATION OF 1-HEPTENE USING BIS(TRIPHENYLPHOSPHINE) PALLADIUM(II) CHLORIDE - TIN(II) CHLORIDE CHANGES IN REACTOR TEMPERATURE

| EXAMPLE | REACTOR TEMPERATURE (°C) | 1-HEPTENE CONVERSION(%) | METHYL OCTANOATE YIELD(%) | HEPTENE ISOMERIZATION(%) | PERCENTAGE LINEAR ESTER |
|---|---|---|---|---|---|
| 33* | 25 | 9.4 | 1 | 1 | N.D. |
| 34 | 60 | 100 | 93 | 8.7 | 92 |
| 35 | 70 | 100 | 92 | 10 | 91 |
| 36 | 80 | 61 | 60 | 1 | 91 |
| 37** | 120 | 2.9 | 1 | 1 | N.D. |

TABLE VII-continued

CARBOXYLATION OF 1-HEPTENE USING BIS(TRIPHENYLPHOSPHINE) PALLADIUM(II) CHLORIDE - TIN(II) CHLORIDE CHANGES IN REACTOR TEMPERATURE

| EXAMPLE | REACTOR TEMPERATURE (°C) | 1-HEPTENE CONVERSION(%) | METHYL OCTANOATE YIELD(%) | HEPTENE ISOMERIZATION(%) | PERCENTAGE LINEAR ESTER |
|---|---|---|---|---|---|
| Run Conditions: | 1-Heptene/Pd = 100 Methanol/Heptene = 7.6 Sn/Pd = 10 | | CO Pressure: 2000 psig Reaction Time: 360 Min. *Reaction Time: 24 hours **Reaction Time: 60 Min. | | |

EXAMPLE 38

SYNTHESIS OF METHYL OCTANOATE FROM 1-HEPTENE THE EFFECT OF CHANGING THE SOLVENT MEDIA

In these examples, using the techniques disclosed in Example 1A, $PdCl_2(P(C_6H_5)_3)_2$—$SnCl_2$ as catalyst, and keeping the temperature at 70°C, and the CO pressure at 2000 psig, the effect of changing the inert solvent media upon the activity of the palladium catalyst is determined. Yields of methyl octanoate in excess of 80 percent were obtained with the palladium catalyst solubilized in a variety of solvents, including ketones, such as acetone and methyl issobutyl ketone, ethers like dimethoxyethane and p-dioxane, aromatics such as benzene, toluene and the xylenes, and halogenated solvents, including methylene chloride and o-dichlorobenzene.

EXAMPLES 39 TO 44

SYNTHESIS OF OTHER LINEAR ACID ESTERS FROM α-OLEFINS

In these examples, using the same experimental procedure as described in Example 1A, various α-olefins including 1-heptene, 1-pentene and propylene were carboxylated in the presence of typical alcohols, cyclic alcohols, substituted alcohols and polyols. Other quantities of reactants, catalyst and solvent remain unchanged. The reaction mixture in each case was sealed and pressurized to 2000 psig and heated to 70°C for up to 6 hours.

The major products were identified, (See Table VIII) as linear fatty acid esters.

useful as catalysts for the carboxylation of alpha olefins to either their linear fatty acid esters or to the linear free acids. These compositions offer the further advantage of being readily available by well known preparative procedures and they have carboxylation efficacies even at substrate to catalyst molar ratios as high as 500 to 1000 to 1 molar ratios, dependent upon the olefin substrate and the particular catalyst employed. Quite unexpectedly, the activity pattern of these palladium complexes do not necessarily follow that of the corresponding platinum complex. This can be seen by the data present in Table III.

In its process aspect this invention provides a novel process for carboxylating relatively low value alphaolefins to more costly linear fatty acids or esters. In addition, reaction times are rapid, the process lends itself to either batch or continuous operation, employing standard equipment. Further, the conversions of alpha olefin are ordinarily above 70 percent and selectivities to the linear saturated acid or ester are of the order of 85 percent and higher.

A further advantage of the instant invention is that while in some respects reaction conditions are critical to success, in other respects the process offers flexibility. That is, numerous modifications and changes can be made in catalyst and alpha olefins, without departing from the inventive concept. The metes and bounds can best be determined by reading the claims which follow in light of the preceding specification.

What is claimed is:

1. A catalytic process for preparing linear saturated fatty carboxylated products from alpha olefins having 3 to 40 carbon atoms by the process of heating a reaction

TABLE VIII

CARBOXYLATION OF α-OLEFINS WITH VARIOUS ALCOHOLS

| EXAMPLE | α-OLEFIN | ALCOHOL | α-OLEFIN CARBOXYLATION (% CONVERSION) | MAJOR CARBOXYLATION PRODUCTS IDENTITY | SELECTIVITY (%) |
|---|---|---|---|---|---|
| 39 | 1-Heptene | Isopropanol | 100 | Isopropyl Octanoate | 88 |
| 40 | " | Ethanol | 100 | Ethyl Octanoate | 91 |
| 41 | " | 2-Chloroethanol | 100 | Ethyl-2-Chloro Octanoate | 87 |
| 42 | 1-Pentene | 1-Dodecanol | 100 | Dodecyl Hexanoate | 83 |
| 43 | " | Phenol | 11 | Phenyl Hexanoate | 71 |
| 44 | Propylene | Dipropylene Glycol | 12 | Dipropylene Glycol Butyrate | 81 |

| Run Conditions: | α-Olefin/Pd = 100 Alcohol/α-Olefin = 3 Sn/Pd = 10 | CO Pressure: 2000 psig Reaction Time: 360 Min. |
|---|---|---|

As the numerous examples and preceding discussion have documented, numerous advantages accrue from the practice of this invention both in its compositional aspect and its process aspects.

For example, a relatively large group of ligand stabilized palladium(II) - Group IVB metal halide catalysts are provided which were heretofore not known to be mixture of:
 a. said alpha olefins to be carboxylated,
 b. at least a catalytic amount of $PdCl_2[As(C_6H_5)_3]_2$—$GeCl_2$ catalyst,
 c. at least a stoichiometric quantity of an alkanol or water, said stoichiometry being based upon the concentration of alpha olefins present, d. and at least a stoichiometric quantity of carbon monoxide, said stoichiometry being based on the alpha olefin content in said reaction mixture, until linear saturated fatty carboxylated products are prepared.

2. A catalytic process for preparing mixtures of linear saturated fatty esters from mixtures of alpha olefins containing 5 to 15 carbon atoms by forming a reaction mixture in the proportion of:
   a. for each molar equivalent of said mixture of alpha olefins to be carboxylated,
   b. at least 1 molar equivalent of an alkanol,
   c. from 0.005 to 0.02 molar equivalents of $PdCl_2[As(C_6H_5)_3]_2$—$GeCl_2$, and
   d. sufficient inert solvent to form a reaction mixture,
   e. pressurizing said reaction mixture with from 1000 to 3000 psig of carbon monoxide and heating said pressurized reaction mixture from 60° to 80°C until said mixtures of linear saturated fatty acid esters are produced.

3. A catalytic process for preparing linear saturated fatty carboxylated products from alpha olefins having 3 to 40 carbon atoms by the process of heating a reaction mixture of:
   a. said alpha olefins to be carboxylated,
   b. at least a catalytic amount of $PdCl_2[P(C_6H_5)_3]_2$—$GeCl_2$,
   c. at least a stoichiometric quantity of an alkanol or water, said stoichiometry being based upon the concentration of alpha olefins present,
   d. and at least a stoichiometric quantity of carbon monoxide, said stoichiometric quantity being based on the alpha olefin content in said reaction mixture, until linear, saturated, fatty carboxylated products are prepared.

4. A catalytic process for preparing mixtures of linear, saturated, fatty esters from mixtures of alpha olefins containing 5 to 15 carbon atoms, by forming a reaction mixture in the proportion of:
   a. for each molar equivalent of said mixture of alpha olefins to be carboxylated,
   b. at least 1 molar equivalent of an alkanol,
   c. from 0.005 to 0.02 molar equivalents of $PdCl_2[P(C_6H_5)_3]_2$—$GeCl_2$, and
   d. sufficient inert solvent to form a reaction mixture, and
   e. pressurizing said reaction mixture with from 1000 to 3000 psig of carbon monoxide and heating said pressurized reaction mixture from 60° to 80°C until said mixture of linear, saturated, fatty acid esters are produced.

* * * * *